(12) United States Patent
Cullinane et al.

(10) Patent No.: US 8,818,608 B2
(45) Date of Patent: *Aug. 26, 2014

(54) ENGAGING AND DISENGAGING FOR AUTONOMOUS DRIVING

(71) Applicant: Google Inc., Mountain View, CA (US)

(72) Inventors: Brian Cullinane, San Jose, CA (US); Philip Nemec, San Jose, CA (US); Manuel Christian Clement, Felton, CA (US); Robertus Christianus Elisabeth Mariet, Sunnyvale, CA (US); Lilli Ing-Marie Jonsson, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,226

(22) Filed: Dec. 3, 2013

(65) Prior Publication Data

US 2014/0156134 A1 Jun. 5, 2014

Related U.S. Application Data

(63) Continuation of application No. 13/792,774, filed on Mar. 11, 2013.

(60) Provisional application No. 61/731,717, filed on Nov. 30, 2012.

(51) Int. Cl.
*G05D 1/00* (2006.01)
*G05D 1/02* (2006.01)

(52) U.S. Cl.
CPC ............ *G05D 1/0212* (2013.01); *G05D 1/0223* (2013.01)
USPC ............... 701/23; 701/96; 701/117; 701/300; 701/301

(58) Field of Classification Search
CPC ....... G05D 1/02; G05D 1/021; G05D 1/0212; G05D 1/0223; G05D 1/02019; G05D 1/0231; G05D 1/0234; G05D 1/0236; G05D 1/0287; G05D 1/0257; G05D 1/0259; G05D 1/0276; G05D 1/0268; G08G 1/16; G08G 1/08; G08G 1/06; G08G 1/09; G08G 1/0968
USPC ........... 701/23, 27, 36, 41, 96, 117, 118, 119, 701/300, 301; 340/900–905, 438, 425.5, 340/937

See application file for complete search history.

(56) References Cited

U.S. PATENT DOCUMENTS 5,521,579 A   5/1996   Bernhard
(Continued)

FOREIGN PATENT DOCUMENTS

EP   2168835 A1   3/2010
JP   2005250564 A   9/2005

OTHER PUBLICATIONS

Sebastian, et al, Stanley: The Robot That Won the DARPA Grand Challenge, Journal of Field Robotics 23(9), 661-692 (2006), 2006 Wiley Periodicals, Inc.
(Continued)

*Primary Examiner* — Richard Camby
(74) *Attorney, Agent, or Firm* — Lerner, David, Littenberg, Krumholz & Mentlik, LLP

(57) ABSTRACT

Aspects of the present disclosure relate switching between autonomous and manual driving modes. In order to do so, the vehicle's computer may conduct a series of environmental, system, and driver checks to identify certain conditions. The computer may correct some of these conditions and also provide a driver with a checklist of tasks for completion. Once the tasks have been completed and the conditions are changed, the computer may allow the driver to switch from the manual to the autonomous driving mode. The computer may also make a determination, under certain conditions, that it would be detrimental to the driver's safety or comfort to make a switch from the autonomous driving mode to the manual driving mode.

20 Claims, 10 Drawing Sheets

(56) References Cited

U.S. PATENT DOCUMENTS

| | | |
|---|---|---|
| 5,644,386 A | 7/1997 | Jenkins et al. |
| 5,684,697 A | 11/1997 | Mullen |
| 5,774,069 A | 6/1998 | Tanaka et al. |
| 5,835,870 A | 11/1998 | Kagawa |
| 5,838,562 A | 11/1998 | Gudat et al. |
| 5,874,904 A | 2/1999 | Hirabayashi et al. |
| 5,906,645 A | 5/1999 | Kagawa et al. |
| 5,983,161 A | 11/1999 | Lemelson et al. |
| 6,044,312 A | 3/2000 | Sudo et al. |
| 6,185,499 B1 | 2/2001 | Kinoshita et al. |
| 6,275,773 B1 | 8/2001 | Lemelson et al. |
| 6,324,463 B1 | 11/2001 | Patel |
| 6,337,638 B1 | 1/2002 | Bates et al. |
| 6,396,417 B2 | 5/2002 | Lee |
| 6,487,500 B2 | 11/2002 | Lemelson et al. |
| 6,516,262 B2 | 2/2003 | Takenaga et al. |
| 6,590,499 B1 | 7/2003 | D'Agosto |
| 6,768,962 B2 | 7/2004 | Bullinger et al. |
| 6,810,330 B2 | 10/2004 | Matsuura |
| 6,868,934 B2 | 3/2005 | Dirrig |
| 7,209,221 B2 | 4/2007 | Breed et al. |
| 7,295,904 B2 | 11/2007 | Kanevsky et al. |
| 7,319,777 B2 | 1/2008 | Morcom |
| 7,321,311 B2 | 1/2008 | Rieth et al. |
| 7,327,238 B2 | 2/2008 | Bhogal et al. |
| 7,430,473 B2 | 9/2008 | Foo et al. |
| 7,446,649 B2 | 11/2008 | Bhogal et al. |
| 7,486,176 B2 | 2/2009 | Bhogal et al. |
| 7,486,177 B2 | 2/2009 | Wilbrink et al. |
| 7,499,774 B2 | 3/2009 | Barrett et al. |
| 7,630,806 B2 | 12/2009 | Breed |
| 7,769,498 B2 | 8/2010 | Isaji et al. |
| 7,783,403 B2 | 8/2010 | Breed |
| 7,865,310 B2 | 1/2011 | Nakano et al. |
| 7,894,951 B2 | 2/2011 | Norris et al. |
| 7,925,438 B2 | 4/2011 | Lo |
| 7,979,172 B2 | 7/2011 | Breed |
| 7,979,173 B2 | 7/2011 | Breed |
| 8,050,863 B2 | 11/2011 | Trepagnier et al. |
| 8,126,642 B2 | 2/2012 | Trepagnier et al. |
| 8,204,670 B2 | 6/2012 | Watanabe |
| 8,269,652 B2 | 9/2012 | Seder et al. |
| 8,320,628 B2 | 11/2012 | Cheng et al. |
| 8,352,110 B1 | 1/2013 | Szybalski et al. |
| 8,384,532 B2 | 2/2013 | Szczerba et al. |
| 8,395,529 B2 | 3/2013 | Seder et al. |
| 8,433,470 B1 | 4/2013 | Szybalski et al. |
| 8,482,431 B2 | 7/2013 | Kushi et al. |
| 8,527,199 B1 * | 9/2013 | Burnette et al. ............... 701/450 |
| 2005/0234612 A1 | 10/2005 | Bottomley et al. |
| 2006/0089765 A1 | 4/2006 | Pack et al. |
| 2008/0071177 A1 | 3/2008 | Yanagidaira et al. |
| 2008/0119994 A1 | 5/2008 | Kameyama |
| 2008/0306668 A1 | 12/2008 | Wang et al. |
| 2009/0147996 A1 | 6/2009 | Peng |
| 2009/0322547 A1 | 12/2009 | Wen |
| 2010/0063663 A1 | 3/2010 | Tolstedt et al. |
| 2010/0085173 A1 | 4/2010 | Yang et al. |
| 2010/0168998 A1 | 7/2010 | Matsunaga |
| 2010/0179715 A1 | 7/2010 | Puddy |
| 2010/0222976 A1 | 9/2010 | Haug |
| 2010/0228417 A1 | 9/2010 | Lee et al. |
| 2010/0332127 A1 | 12/2010 | Imai et al. |
| 2011/0140919 A1 | 6/2011 | Hara et al. |
| 2011/0193722 A1 | 8/2011 | Johnson |
| 2012/0035788 A1 | 2/2012 | Trepagnier et al. |
| 2012/0109418 A1 | 5/2012 | Lorber |
| 2012/0269391 A1 | 10/2012 | Saito |
| 2012/0283942 A1 | 11/2012 | T'Siobbel et al. |
| 2012/0288156 A1 | 11/2012 | Kido |
| 2013/0129150 A1 | 5/2013 | Saito |
| 2013/0131905 A1 | 5/2013 | Green et al. |
| 2013/0131906 A1 | 5/2013 | Green et al. |
| 2013/0131907 A1 | 5/2013 | Green et al. |

OTHER PUBLICATIONS

Sebastian Thrun, Toward Robotic Cars, Apr. 2010, pp. 99-106, No. 4, Communications of the ACM.

Bakambu et al., "Autonomous system for exploration and navigation in drift networks", 2004 IEEE Intelligent Vehicles Symposium, University of Parma, Parma, Italy, Jun. 14-17, pp. 212-217, 2004.

International Search Report and Written Opinion for Application No, PCT/US2013/071846 dated Mar. 7, 2014.

* cited by examiner

FIGURE 1    100

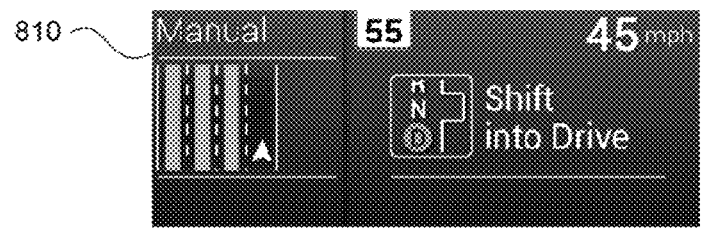
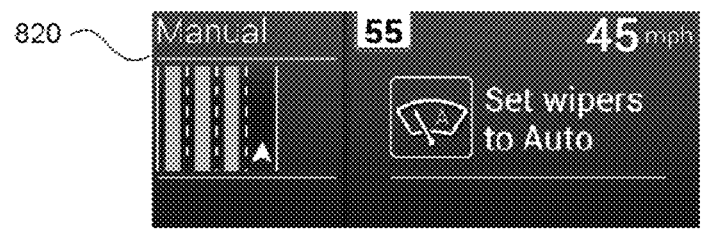
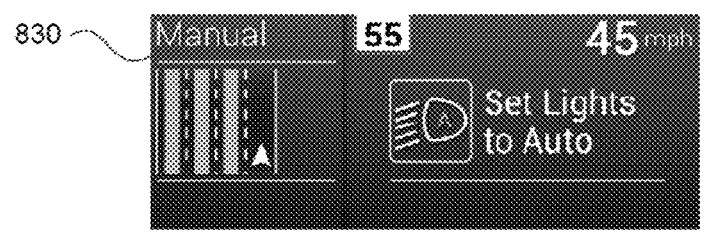
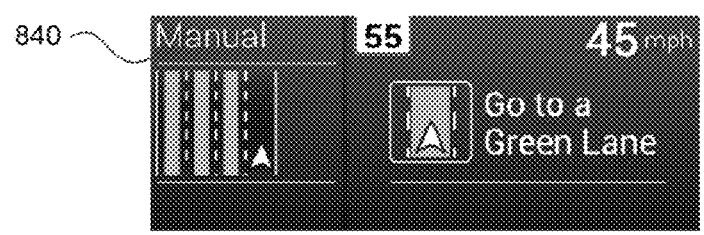
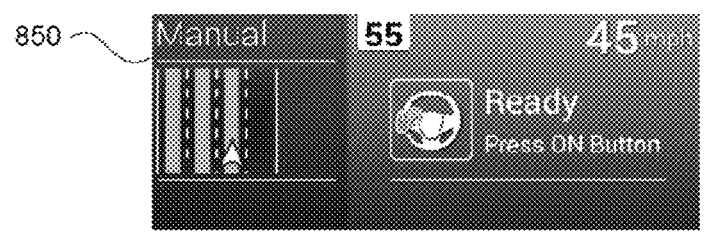
FIGURE 8

ENGAGING AND DISENGAGING FOR AUTONOMOUS DRIVING

CROSS REFERENCE TO RELATED APPLICATIONS

This application is a continuation of U.S. patent application Ser. No. 13/792,774, filed on Mar. 11, 2013, which claims the benefit of the filing date of U.S. Provisional Patent Application No. 61/731,717 filed Nov. 30, 2012, the entire disclosures of which are hereby incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual driving mode (where the operator exercises a high degree of control over the movement of the vehicle) to an autonomous driving mode (where the vehicle essentially drives itself) to modes that lie somewhere in between.

BRIEF SUMMARY

Aspects of the disclosure provide a method. In such aspects, the method includes receiving a request to switch a vehicle from a manual driving mode to an autonomous driving mode. In response, protocol data is accessed. This protocol data is used by a processor to assess the status of the vehicle's environment, the vehicle and systems of the vehicle, and a driver and identify one or more conditions. The method also includes accessing task data which associates conditions with tasks that may be performed by a driver to change the condition. The task data is used to generate a set of tasks. Each task of the set of tasks is displayed in an ordered sequence. Once the tasks are complete, the switch from the manual driving mode to the autonomous driving mode may proceed.

In one example, assessing the status of the vehicle's environment, the vehicle and systems of the vehicle, and a driver includes accessing sensor data, accessing detailed map information, communicating with various systems of the vehicle, and communicating with a remote computer.

The assessments may include, for example, one or more of determining whether the current or future weather would make autonomous driving unsafe, uncomfortable for the vehicle's passengers or damage the vehicle, whether the vehicle's actual location agrees with the vehicle's location relative to the detailed map information, whether data received from the sensors of the detection system agrees with the corresponding detailed map information, whether the vehicle is currently driving in an area pre-approved for initiating the autonomous mode, whether the vehicle is currently driving in a lane pre-approved for initiating the autonomous mode, whether the roadway is paved (as opposed to dirt), whether the road is wide enough (as opposed to being too narrow for two vehicles to pass one another), whether the vehicle is on a straight roadway (as opposed to driving around a curve, down or up a hill, etc.), whether the vehicle is sufficiently centered in the lane, whether the vehicle is surrounded by or boxed in by other vehicles (for example, in dense traffic conditions), whether the vehicle is currently in a school zone, whether the vehicle is facing oncoming traffic (for example, driving northbound in a southbound lane according to the detailed map information), whether another vehicle is pulling into the vehicle's lane proximate to the vehicle, whether the vehicle is at least some pre-determined minimum distance from other vehicles or moving objects in the roadway, whether the vehicle must make any small maneuvers to avoid non-moving or slow moving objects in the roadway, whether the vehicle is traveling too fast or too slow, whether any upcoming maneuvers would prevent a switch from manual to autonomous driving mode, whether the vehicle can be driving in the autonomous mode for a minimum period of time before a switch to manual mode is required, whether the various features of the autonomous driving system of vehicle are working properly, whether the vehicle has met minimum maintenance standards (for example, oil changes are up to date), whether the vehicle's tires are properly inflated, whether the vehicle's doors are closed, whether the vehicle is currently in "drive" (as opposed to "neutral," "reverse," or "park"), whether the vehicle is in two wheel drive (for example, on a vehicle which allows for the driver to manually switch into four wheel or all wheel drive), whether the vehicle's automatic wipers are currently on, whether the vehicle's headlights or fog lights are on, and whether no other warning indicators (such as check engine lights) are currently active, and whether the driver's seatbelt is properly buckled.

Other conditions that prevent a switch from manual to autonomous mode may include that the vehicle is not in "drive," that the automatic wipers are not on, that the automatic lights are not on, and that the vehicle is not in a lane pre-approved for initiating autonomous driving. In such cases, the generated set of tasks may include putting the vehicle in drive, turning on automatic wipers, turning on automatic lights, and moving the vehicle to a lane pre-approved for initiating autonomous driving. In this example, the sequence of displayed tasks includes a first displayed task for putting the vehicle in drive, a second displayed task for turning on automatic wipers, a third displayed task turning on automatic lights, and a fourth displayed task moving the vehicle a lane pre-approved for initiating autonomous driving. The first displayed task is displayed until confirmed completed. When the first displayed task is completed, the second displayed task is displayed until the second task is completed. When the second displayed task is completed, the third displayed task is displayed until the third task is completed. When the third displayed task is completed, the fourth displayed task is displayed until the fourth task is completed.

In another example, the preventive conditions may include that the vehicle is not in "drive," that the automatic wipers are not on, that the automatic lights are not on, that the vehicle is not in a lane pre-approved for initiating autonomous driving, that the vehicle is not centered in a lane, that the vehicle is then moving too fast, and that the vehicle is too close to another object in the roadway. In this example, the generated set of tasks may include putting the vehicle in drive, turning on automatic wipers, turning on automatic lights, moving the vehicle a lane pre-approved for initiating autonomous driving, centering the vehicle in the lane, slowing the vehicle down, and increasing the distance between the vehicle and the another object in the roadway.

In another example, the method also includes, before using the task data to generate the set of tasks, correcting by the processor any of the identified one or more conditions pre-approved for correction by the processor. In another example, assessing the status is performed continuously while the tasks are being completed. In this regard, additional conditions may be identified and used to add additional tasks to the set of tasks.

In another example, the method may also include, after switching to the autonomous driving mode, maneuvering the vehicle in the autonomous driving mode and receiving a request to switch from the autonomous driving mode to the manual driving mode. This request may be not recommended or denied when the vehicle is performing an action that cannot be safely or easily transferred to the driver before the action is complete. In this example and in response to an indication by the user that the user wants to return to manual mode, a warning may be displayed to the driver when switching to manual driving mode is not recommended.

Other aspects of the disclosure provide systems including a processor which performs some or all of the various features of the methods described above. Further aspects of the disclosure provide a non-transitory, tangible computer-readable storage medium on which computer readable instructions of a program are stored. The instructions, when executed by a processor, cause the processor to perform some or all of the various features of the methods described above.

BRIEF DESCRIPTION OF THE DRAWINGS

FIG. 8 is a series of screen images in accordance with aspects of the disclosure.

DETAILED DESCRIPTION

Figure 1:
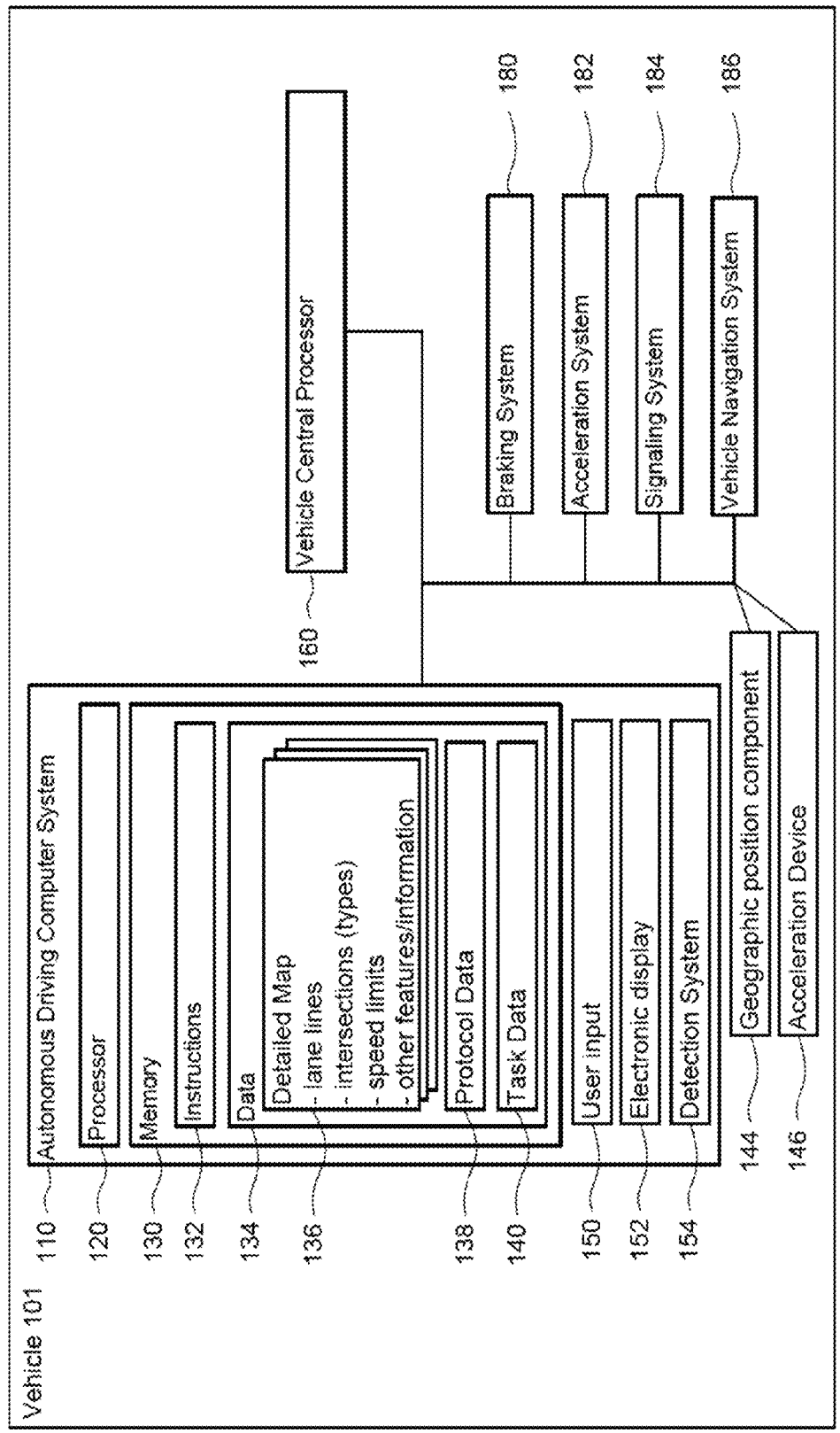
FIG. 1 is a functional diagram of a system in accordance with aspects of the disclosure.

A vehicle may make a variety of determinations before allowing a driver to operate a vehicle in an autonomous driving mode, such as handing off control of the vehicle to the vehicle's computer, or allowing the driver to switch from the autonomous driving mode to the manual driving mode. This may include conducting a series of environmental, system, and driver checks and also providing a driver with a checklist of tasks before allowing the driver to hand off control of the vehicle to the vehicle's computer.

In one example, a computer associated with a vehicle having an autonomous driving mode and a manual driving mode may receive a request to switch from a manual driving mode to an autonomous driving mode. The computer may then respond by accessing protocol data and using it to assess status of the vehicle's current environment, the vehicle's likely future environment, the vehicle, and the driver. The computer may then determine if these assessments have identified any conditions that the system uses to prevent vehicle from being placed into an autonomous driving mode (hereafter, "preventive conditions"). If not, the computer may proceed with the switch from the manual to the autonomous driving mode.

If, as a result of the assessments, the computer identifies one or more preventive conditions, the computer may determine whether the computer or driver can change those identified conditions immediately or within a certain period of time. If the preventive conditions cannot be so changed, the computer may display a failure message to the driver. In some examples, this failure message may indicate the particular issue for the failure.

If the computer can change the identified preventive conditions, the computer may take the actions necessary to do so. Even if the computer is otherwise capable of changing the preventive condition, the vehicle may be designed to require the driver to change the condition. For example, the driver may be in a better position to assess if and how the preventive condition can be changed. If no identified preventive conditions remain, the computer may proceed with the switch from the manual to the autonomous driving mode.

If after the computer corrects any of the preventive conditions other preventive conditions remain, the computer may generate a corresponding task or task for each of the remaining problem conditions. The computer may then display the tasks in order of priority to the driver. For example, the computer may be programmed to always display the tasks one at a time in a predetermined order, or dynamically determine the order in which the remaining tasks should be displayed. Once the task is completed, the computer may display the next task for completion. The compute may continue to display the tasks until each is corrected, and the computer may then proceed with the switch from manual to autonomous driving mode. In addition, this list may be recomputed periodically such that if one of the steps is completed while another step is being shown, then the completed task may be removed.

While the driver is performing the tasks, the computer may continue to make the aforementioned assessments to identify any additional preventive conditions. These conditions may then cause the computer to display the error message, correct the additional preventive conditions, or generate and display additional tasks for completion by the driver. Again, if all of the preventive conditions have been corrected, the computer may proceed with the switch from the manual to the autonomous driving mode.

The computer may similarly make assessments to determine whether switching the vehicle from the autonomous driving mode to the manual driving mode is not currently recommended.

As shown in FIG. 1, an autonomous driving system 100 in may include a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 152 (e.g., a monitor having a screen, a small LCD touch-screen or any other electrical device that is operable to display information), user input 150 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
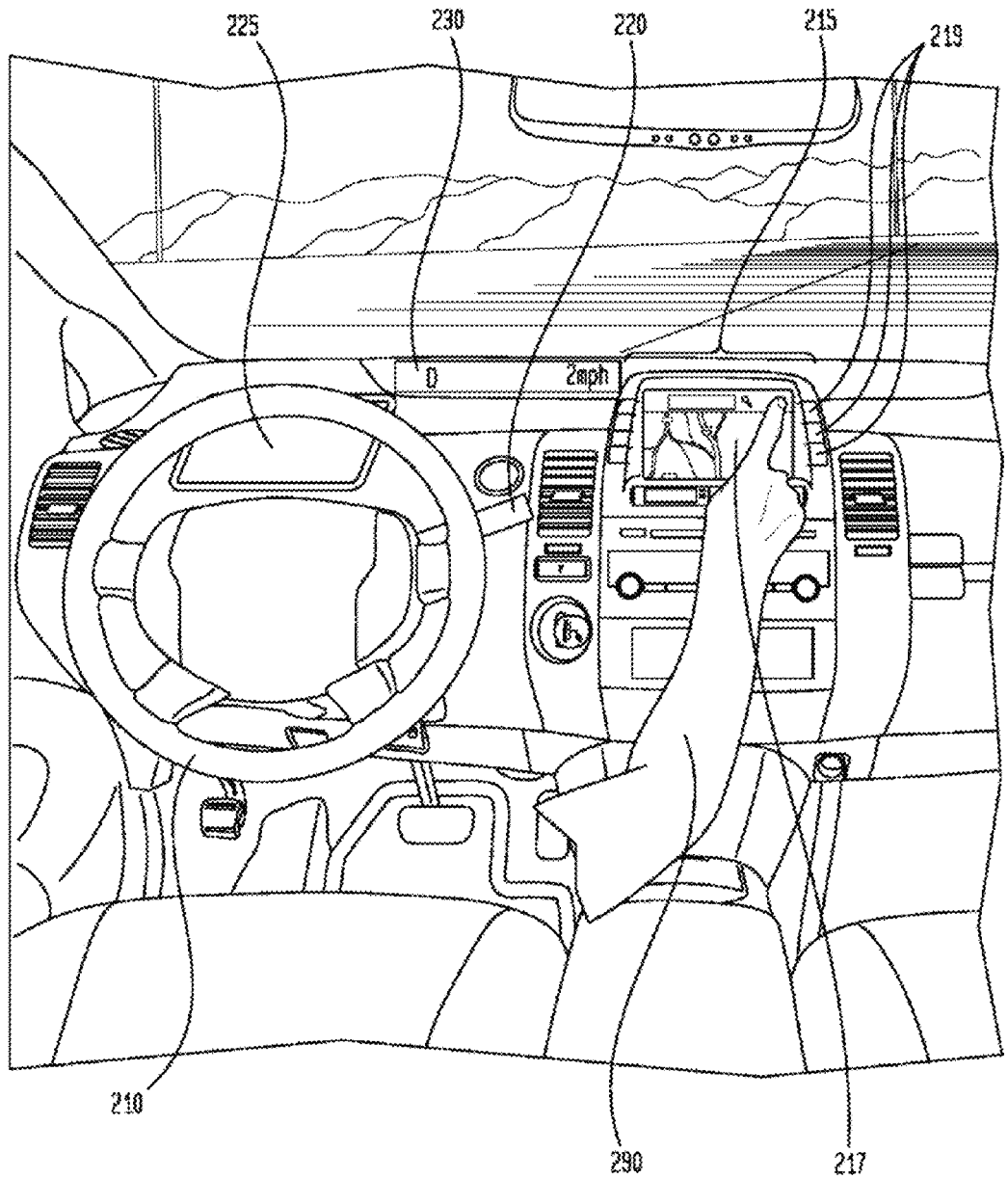
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (which may be a part of electronic display 152), or button inputs 219, for activating or deactivating one or more autonomous driving modes and for enabling a driver or passenger 290 to provide information, such as a navigation destination, to the autonomous driving computer 110.

The autonomous driving computing system may be capable of communicating with various components of the vehicle. For example, returning to FIG. 1, computer 110 may be in communication with the vehicle's central processor 160 and may send and receive information from the various systems of vehicle 101, for example the braking system 180, acceleration system 182, signaling system 184, and navigation system 186 in order to control the movement, speed, etc. of vehicle 101. In one example, the vehicle's central processor 160 may perform all of the functions of a central processor in a non-autonomous computer. In another example, processor 120 and 160 may comprise a single processing device or multiple processing devices operating in parallel.

In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it, which can often be determined with better accuracy than absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous driving mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system 154 may include lasers, sonar, radar, cameras or any other detection devices which record data which may be processed by computer 110. For example, if the vehicle is a small passenger vehicle, the car may include a laser mounted on the roof or other convenient location.

Figure 3:
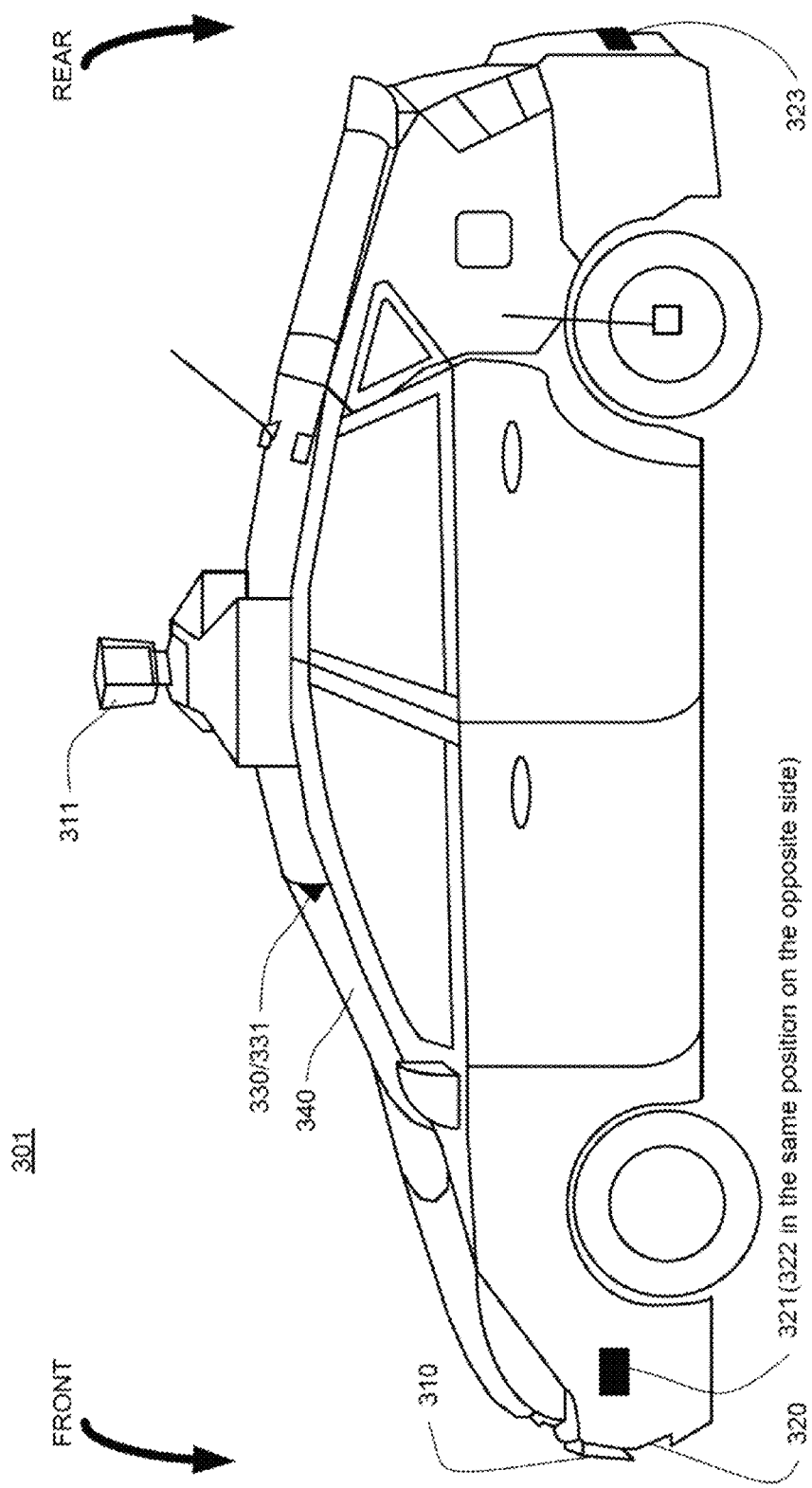
FIG. 3 is an exterior of an autonomous vehicle in accordance with aspects of the disclosure.

As shown in FIG. 3, vehicle 101 may include a small passenger vehicle having lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 101 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 101 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

In addition to the sensors described above, the computer may also use input from other sensors and features typical to non-autonomous vehicles. For example, these other sensors and features may include tire pressure sensors, engine temperature sensors, brake heat sensors, break pad status sensors, tire tread sensors, fuel sensors, oil level and quality sensors, air quality sensors (for detecting temperature, humidity, or particulates in the air), door sensors, lights, wipers, etc. This information may be provided directly from these sensors and features or via the vehicle's central processor 160.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, vegetation, or other such objects and information. For example, the map information may include explicit speed limit information associated with various roadway segments. The speed limit data may be entered manually or scanned from previously taken images of a speed limit sign using, for example, optical-character recognition.

Figure 4:
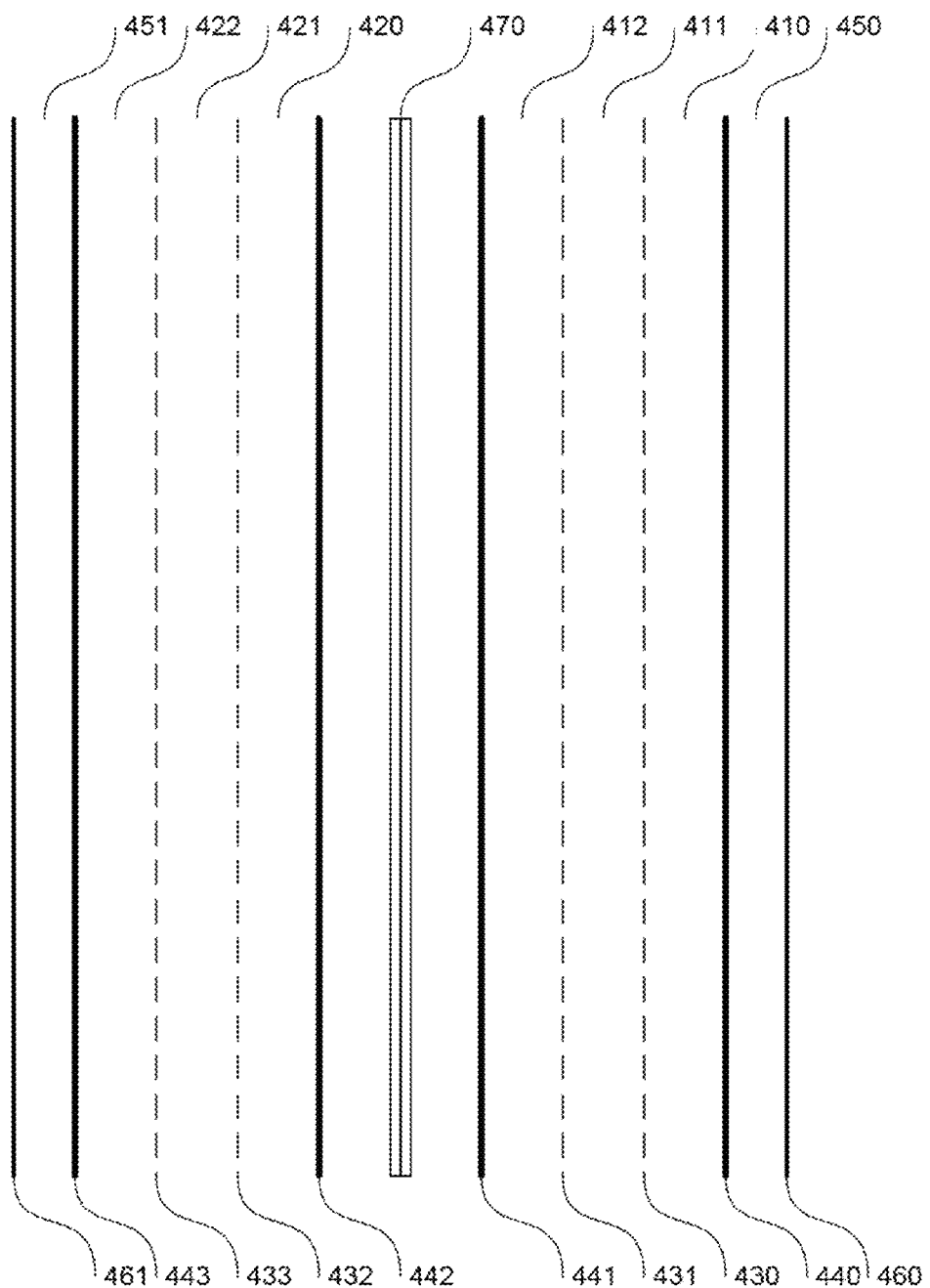
FIG. 4 is an illustration of a highway used by way of example in accordance with aspects of the disclosure.

FIG. 4 is an example of a highway 400. In this example, highway 400 includes 3 northbound lanes 410-412 and 3 southbound lanes 420-22 defined by broken lane lines 430-33 and solid lane lines 440-43. Highway 400 also includes shoulders 450-51 defined between solid lane line 440 and barrier 460 and solid lane line 441 and barrier 461, respectively. Between the northbound and southbound lanes, highway 400 includes a median 470.

Figure 5:
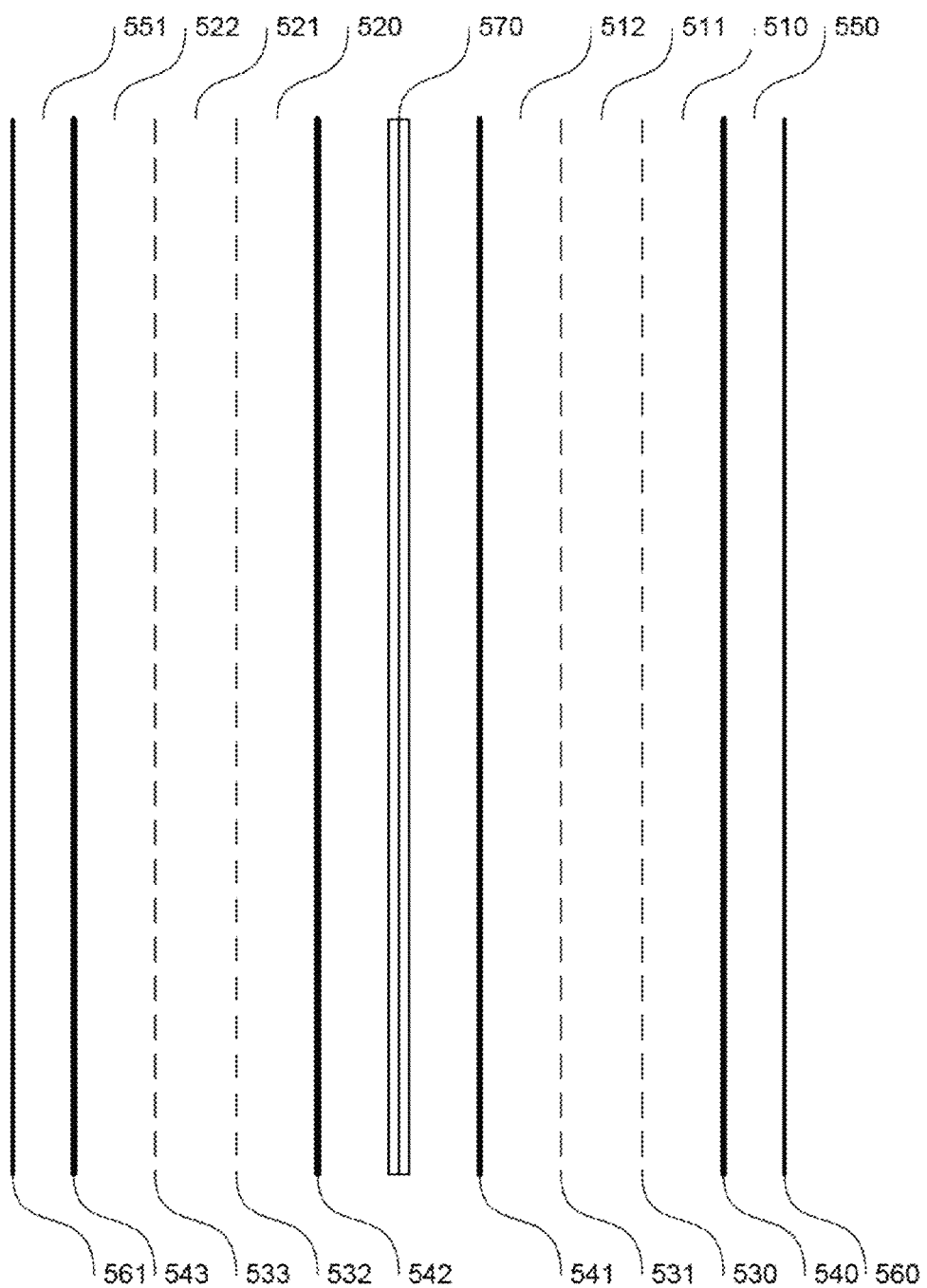
FIG. 5 is an example of map information in accordance with aspects of the disclosure.

FIG. 5 is an example of map information 500 for highway 400 of FIG. 4. Map information includes data indicating the location and orientation of the various features of highway 400. For example, map information 500 includes northbound lane data 510-512 identifying northbound lanes 410-412 as well as southbound lane data 520-522 identifying southbound lanes 420-22. Map information 500 also includes broken lane line data 530-33 and solid lane lines 540-43 representing broken lane lines 430-33 and solid lane lines 440-43. Shoulders 450-51 are also represented by shoulder data 550-551. Barriers 460-61 are represented by barrier data 560-61, and median 470 is represented by median data 570.

The map information may also include three-dimensional terrain maps incorporating one or more of objects listed above. For example, the vehicle may determine that another object, such as a vehicle, is expected to turn based on real-time data (e.g., using its sensors to determine the current GPS position of another vehicle and whether a turn signal is blinking) and other data (e.g., comparing the GPS position with previously-stored lane-specific map data to determine whether the other vehicle is within a turn lane).

The map information 136 may also include autodrive zones which are currently available for autonomous driving. Autodrive zones may include for examples, areas within the map information which have been pre-approved or otherwise designated for initiating driving in an autonomous driving mode. These areas may include, for example, specific lanes on a highway, residential streets, etc. In this regard, autodrive zones may include pre-determined autodrive lanes. Areas which may be excluded from autodrive zones may include, by way of example only, acceleration lanes, exit lanes, merges, intersections, toll booths, known construction zones, and school zones and portions of roadway near such areas. Although computer 110 may restrict initiating the autonomous driving mode in areas which are not designated as autodrive zones, the computer 110 may actually be fully capable of maneuvering the vehicle through such areas or actually initiating the autonomous driving mode.

For example, map information 600 of FIG. 600 includes map information 500 and also autodrive zones 610 and 620. In this example, autodrive zone 610 includes the southbound lanes 430-32 (represented by southbound lane data 530-32) of highway 400 while autodrive zone 620 includes only a portion of the northbound lanes 420-22 (represented by northbound lane data 520-22) of highway 400. Autodrive zone 610 includes the zones of lanes 410-22 (represented by lanes 510-22); however, in this example, only lanes 410 (510) and 411 (511) include autodrive lanes 611 and 612, respectively. Similarly, autodrive zone 620 includes portions of the zones of lanes 420-22 (represented by lanes 520-22); however, in this example, only lanes 421 (521) and 422 (522) include autodrive lanes 621 and 622, respectively. Thus, not all portions of highway 400 are autodrive zones, and not all lanes within autodrive zones are autodrive lanes.

Although the detailed map information 136 is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location whether or not it is linked to other related features. For example, a stop sign may be linked to a road and an intersection. In some examples, the associated data may include grid-based indices of a roadgraph to promote efficient lookup of certain roadgraph features.

Figure 6:
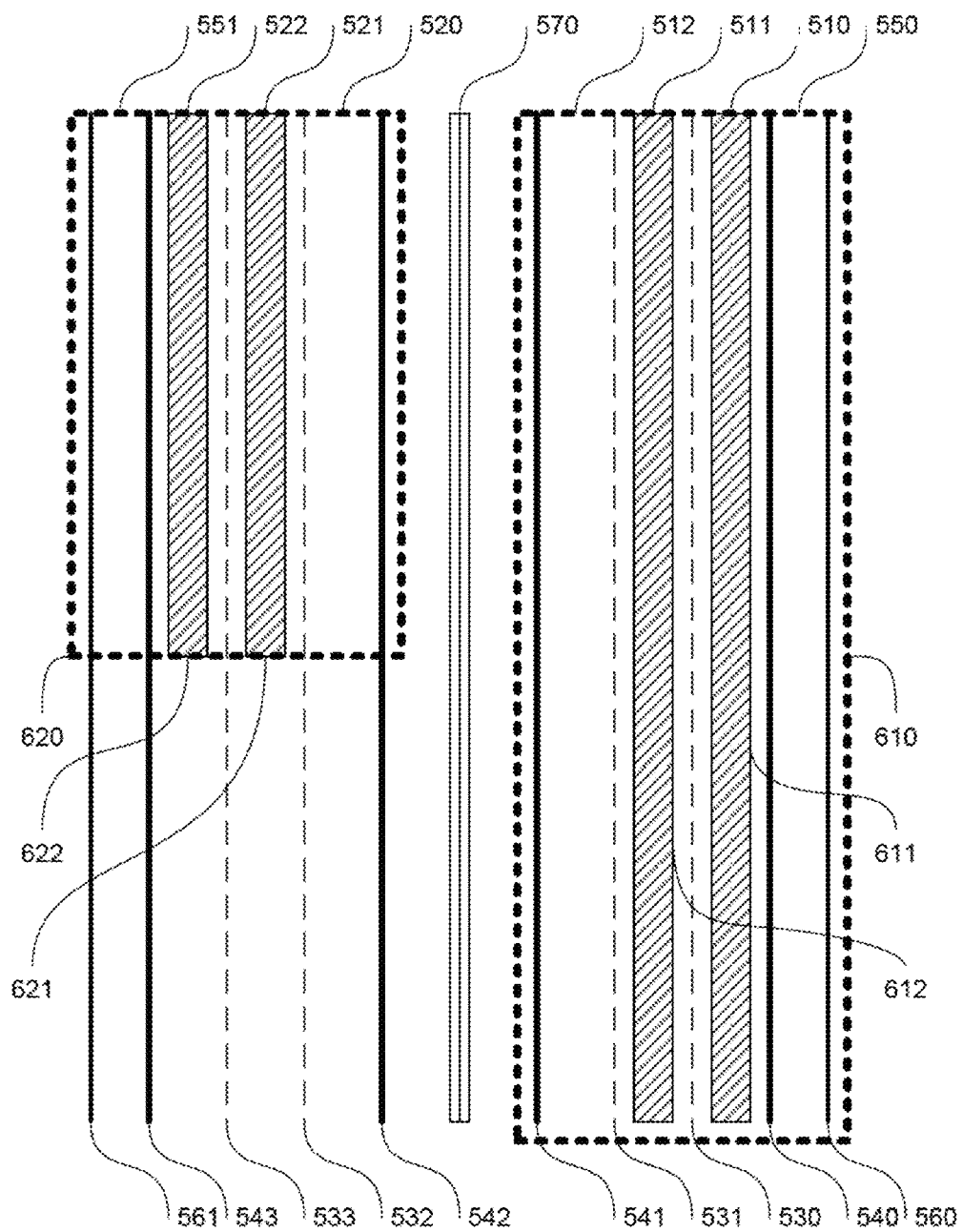
FIG. 6 is another example of map information in accordance with aspects of the disclosure.
Figure 7A:
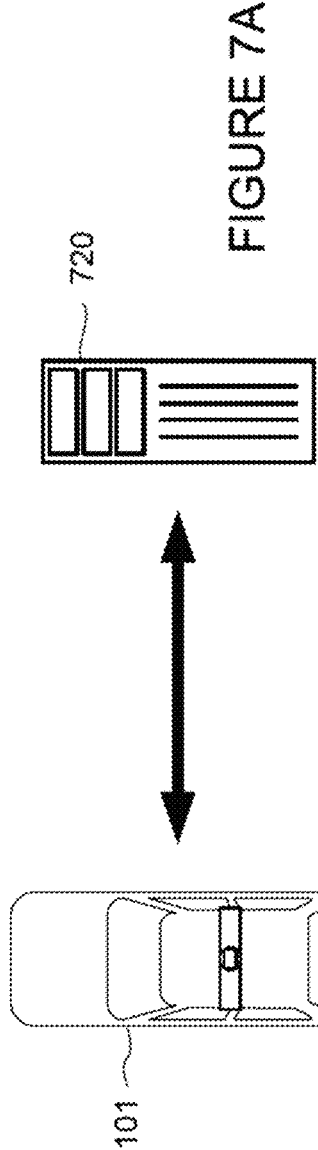
FIG. 7A is a pictorial diagram of a system in accordance with aspects of the disclosure.
Figure 7B:
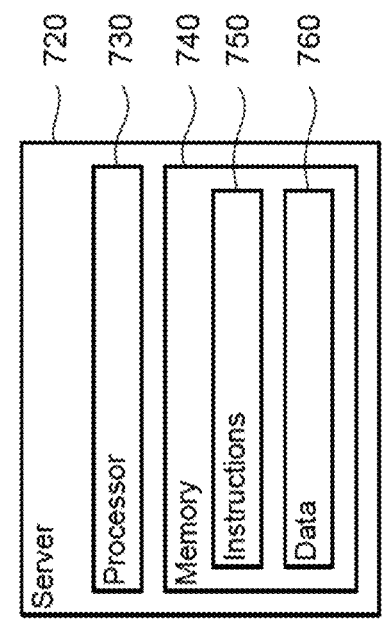
FIG. 7B is a functional diagram of a system in accordance with aspects of the disclosure.

Computer 110 may also receive or transfer information to and from other computers. For example, the map information stored by computer 110 (such as the examples of map information 500 and 600 shown in FIGS. 5 and 6) may be received or transferred from other computers and/or the sensor data collected from the sensors of vehicle 101 may be transferred to another computer for processing as described herein. As shown in FIGS. 7A and 7B, data from computer 110 within vehicle 101 may be transmitted via a network to stationary computer 720 for further processing. Similarly, data from computer 720, such as software updates or weather information as described below, may be transmitted via the network to computer 110. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 720.

In one example, computer 720 may comprise a server having a plurality of computers, e.g., a load balanced server farm, that exchange information with different nodes of a network for the purpose of receiving, processing and transmitting the data to and from computer 110. The server may be configured similarly to the computer 110, with a processor 730, memory 740, instructions 750, and data 760.

As noted above, data 760 of server 720 may provide software updates and/or weather related information. For example, server 720 may provide software updates to computer 110 including, for example, updating the various data stored in memory 130 such as instructions 132, detailed map information 136, protocol data 138, and/or task data 140. In another example, server 720 may receive, monitor, store, update, and transmit various information related to weather. This information may include, for example, precipitation, cloud, and/or temperature information in the form of reports, radar information, forecasts, etc.

Computer 110 may use protocol data 138 for assessing whether changing to or from autodrive mode will be permitted based on an assessment of the status of the vehicle's environment, the vehicle, as well as the driver. As described in more detail below, computer 110 may use protocols 138 to identify preventive conditions and whether those preventive conditions may be corrected by the computer or the driver.

Task data 140 may include a series of tasks that can be performed by a driver controlling a vehicle such as vehicle 101. As discussed in more detail below, these tasks may include closing a door, buckling a seatbelt, changing lanes, etc. Each task may be associated with a corresponding preventive condition such that the performance of the task by a driver of a vehicle will correct a preventive condition identified using protocol data 138. In this regard, task data may be stored as a part of protocol data 138 or separately.

The computer 110 may determine a proper order for each task. In this regard, buckling a seatbelt may have a higher rank than changing lanes, as it would be unsafe for the driver to control the vehicle without wearing a seatbelt, etc. The task data may also include instructions and display data for presenting tasks to the driver. For ease of reference, this disclosure will refer to the ranking data as being part of the task data 140, but the information required to determine the order of each task may be stored as part of protocol data 138, elsewhere in data 134 and as part of the instructions 132.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one example, a driver of vehicle 101 may activate the autonomous driving system 100 and use a user input 150 to request that the vehicle switch from a manual driving mode to an autonomous driving or autodrive mode. Before granting the request, the computer 110 may determine whether any conditions exist that will be used to prevent the switch. This may include accessing protocol data 138 and assessing the status of the vehicle's environment (current and likely future), the status of the vehicle and the vehicle systems, as well as the status of the driver to identify any preventive conditions. For example, preventive conditions may include conditions indicating that it might be unsafe to switch from manual to autonomous driving mode, that the vehicle is an area in which autonomous driving is prevented by law, or that vehicle is not designed for autonomous driving in the current environment (e.g., off-road travel).

The assessment of the status of the vehicle's environment may rely on information collected by the vehicle's various sensors, stored map information, as well as information from a remote computer. For example, the assessments may include determining the status of the weather in the vehicle's immediate environment and whether this information indicates that it would be safer for the driver to retain full control of the vehicle. This may include receiving weather data from computer 720 and/or detecting weather conditions from the vehicle's sensors. Generally, driver may be in a better position to navigate the vehicle than the computer 110 when there is heavy or accumulating precipitation such as rain, snow, hail, etc. Thus, under such weather conditions, computer 110 may identify a preventive condition.

Other current environmental assessments may include examining the current location and speed of the vehicle and determining whether the vehicle is at an acceptable location and speed for switching from manual to autonomous driving mode. The vehicle's location may be received or determined from data generated by geographic position component 144 and/or acceleration device 142. This location may be combined with data from the various sensors of the detection system 154 as well as map information 136. For example, computer 110 may assess whether the vehicle's actual location agrees with the vehicle's location relative to the detailed map information, whether data received from the sensors of the detection system agrees with the corresponding detailed map information, whether the vehicle is currently driving in an autodrive zone, whether the vehicle is currently driving in an autodrive lane, whether the roadway is paved (as opposed to dirt), whether the road is wide enough (as opposed to being too narrow for two vehicles to pass one another), whether the vehicle is on a straight roadway (as opposed to driving around a curve, down or up a hill, etc.), whether the vehicle is sufficiently centered in the lane, whether the vehicle is surrounded by or boxed in by other vehicles (for example, in dense traffic conditions), whether the vehicle is currently in a school zone, whether the vehicle is facing oncoming traffic (for example, driving northbound in a southbound lane according to the map information 136), whether another object is pulling into the vehicle's lane proximate to the vehicle, whether the vehicle is at least some pre-determined minimum distance from other vehicles or moving objects in the roadway, whether the vehicle must make any small maneuvers to avoid non-moving objects in the roadway, whether the vehicle is traveling too fast or too slow, etc. If any of these conditions are not true, computer 110 may identify that condition as a problem condition.

In addition to the vehicle's current environment, computer 110 may assess the driving environment that the vehicle is likely to encounter in the future. In this regard, rather than relying on data from the vehicle's detection system 154, computer 110 may receive and/or access data from a remote computer, stored map information, and user input.

In one example, the computer 110 may assess whether any upcoming situations or maneuvers are likely to create a prevention condition. For instance, the computer may check the map data for upcoming prevention conditions if the driver were to maintain the vehicle's current trajectory or stay on a recommended route. The fact that a prevention condition is likely to occur in the future may, itself, be considered a prevention condition that will prevent the user from activating the autodrive mode.

The amount of time that is expected to elapse until the future prevention condition is likely to occur may be used to determine whether the user will be prevented from placing the vehicle into autodrive mode. In one example, there may be some minimum amount of time during which the vehicle can be driven autonomously before it reaches a location where manual driving mode would be required, such as at a traffic intersection or merge. The lane of the road may continue, but the current lane may cease to be an autodrive lane at the intersection. The computer may thus estimate, based on the speed of vehicle or other data (such as the road's speed limit), the amount of time it will take for the vehicle to reach the intersection. If the estimated duration is less than a threshold, the upcoming intersection may be considered a current prevention condition. The threshold may be predetermined or dynamically calculated. For example, the threshold may be set to approximately 50 seconds since users may consider it disruptive to put the car into autodrive mode and then be forced out of autodrive mode within a span of 50 seconds. The threshold may also be dynamically determined, i.e., the threshold may be increased in bad weather.

Computer 110 may also use protocol data 138 to assess the status of the vehicle and the vehicle's various systems and determine whether there is a prevention condition. For example, computer 110 may determine whether the various features of the autonomous driving system 100 are working properly. This may include communicating with a remote computer, such as computer 720, to determine whether computer 110 has the most up to date software. In addition, computer 110 may also communicate with the various components of autonomous driving system 100 to ensure that both the computer 110 is able to communicate with these systems and also to determine whether those systems are working properly. For example, computer 110 may determine whether the various sensors of detection system 154 are working properly, responsive, properly calibrated, etc. In not, computer 110 may identify a problem condition.

In addition to communicating with the components of autonomous driving system 100, computer 110 may also determine the status of the vehicle's various non-autonomous components. This may include querying the vehicle's central processor 160 for information regarding the status of the vehicle. In this regard, the vehicle's central processor 160 may be in communication with other vehicle features or sensors, such as the lights, drive system, tire pressure monitors, door sensors, etc.

Computer 110 may then use this information regarding the other vehicle features and sensors to make various assessments. For example, computer 110 may determine whether the vehicle has met minimum maintenance standards (for example, oil changes are up to date), whether the vehicle's tires are properly inflated, whether the vehicle's doors are closed, whether the vehicle is currently in "drive" (as opposed to "neutral," "reverse," or "park"), whether the vehicle is in two wheel drive (for example, on a vehicle which allows for the driver to manually switch into four wheel or all wheel drive), whether the vehicle's automatic wipers are currently on, whether the vehicle's headlights or fog lights are on, and whether no other warning indicators (such as check engine lights) are currently active. In not, computer 110 may identify a prevention condition.

Computer 110 may also use protocol data 138 to assess the status of the vehicle driver. For example, computer 110 may also query central processor 160 to determine whether the driver's seatbelt is properly buckled. Other examples may include using sensors or other methods to determine driver sleepiness, driver intoxication, or whether the driver is authorized or not to use the vehicle.

The assessments need not be organized into distinct environmental, vehicle, or driver conditions but may actually comprise a larger collection or list of features for assessment. Alternatively, some features identified as being associated with a particular status assessment may be associated with other status assessments or checked multiple times. For example, whether the driver door is open may be an assessment made as part of a vehicle status assessment as well as a driver status assessment.

The assessments made by computer 110 according to protocol data 138 may be performed in any order. In addition, many of these assessments may be made simultaneously, for example by multiple processors operating in parallel. The assessments may be made repeatedly before receiving an autodriving request (or a request to use the autodrive mode), may be made at the time of receiving an autodriving request, may be checked repeatedly after receiving an autodriving request, and any combination of the foregoing.

Once computer 110 has identified a prevention condition that would prevent the transition from manual to autonomous driving mode, the computer may determine whether the computer or the driver can take immediate corrective action. If not, the computer 110 may generate a notification to the driver informing him that the autonomous driving mode is currently unavailable. This notification may also include information indicating the reason why the autonomous driving mode is unavailable. The notification may also be displayed to the driver, for example, using electronic display 152.

For example, referring to the assessments regarding the status of the vehicle's environment, neither the computer 110 nor the driver could change current weather conditions. In this regard, computer 110 may generate and display a notification explaining that the autonomous driving mode is currently unavailable due to the weather conditions.

In another example, referring to the status of the vehicle, neither the computer 110 nor the driver may be able to immediately change vehicle maintenance issues, such as an oil change indicator, low tire pressure indicator, or other more serious issues with regard to the various sensors of detection system 154. Similarly, neither computer 110 nor the driver may be able to immediately change a prevention condition caused by the failure of sensor to provide data. For example, if the computer 110 is unable to determine whether the driver is wearing his seatbelt, simply asking the driver may not be sufficient to ensure that the seatbelt is actually operational and that the driver is wearing it. Accordingly, neither computer 110 nor the driver may be able to correct such a problem condition, and again, computer 110 may generate and display a notification explaining that the autonomous driving mode is currently unavailable due to the prevention condition.

If the computer 110 is able to take corrective action to address the prevention condition, the computer may do so. For example, if the assessment of the vehicle's status indicates a problem with the vehicle's sensors which can be corrected by computer calibration, the computer 110 may recalibrate the sensors and continue with any items remaining to be assessed. In another example, if computer 110 determines that it does not have the most up to date software, this prevention condition may be corrected by getting a software update, for example, from computer 720. In another example, computer 110 may correct some prevention conditions with a short delay. Various other problem conditions may also be corrected by computer 110. In addition, the computer may also perform some or all of these corrective actions proactively, rather than waiting for the driver to request a switch from manual driving mode to autonomous driving mode. The computer corrective actions may also be performed in parallel with one another and/or in parallel with driver performed corrective actions.

While computer 110 may be capable of correcting many different problem conditions, it may be safer to request the driver to address at least some prevention conditions rather than computer 110. In this regard, for at least some prevention conditions, computer 110 may use task data 140 to generate tasks for such conditions.

For example, referring to the status of the vehicle's environment, computer 110 may generate tasks for changing the vehicle's location and/or speed. Depending upon the prevention condition, these tasks may include moving the vehicle to an autodrive lane, centering the vehicle in a lane, creating a sufficient space between the vehicle and some other moving object in the roadway, and speeding up or slowing down the vehicle. Similarly, referring to the status of the vehicle, computer 110 may generate tasks for correcting prevention conditions with regard to an improperly closed or open door, using the gear shift to put the vehicle into "drive", turning on automatic wipers, turning on lights, etc. Regarding the status of the driver, the computer 110 may generate a task requesting the driver to put on his seatbelt, etc.

As noted above, each task generated by the computer 110 using the task data 140 may be ranked. Thus, after generating all of the required tasks to correct any identified prevention conditions, the computer 110 may use the rankings to order the tasks and then present the ordered tasks to the driver. This may allow the computer 100 to provide the checklist to the driver in an order that promotes safety and is consistent with prerequisites. For example, a driver might be instructed to put on his seatbelt before being asked to put the vehicle in "drive" and before asked to move to an autodrive lane.

Similarly, although the driver may be presented with multiple tasks at the same time, it may be more helpful to provide each task to the driver one at a time, waiting until each task has been completed before providing the driver with the next task. In addition, tasks which require a longer time to complete may need to be followed by another driver request to switch to the autonomous mode while other tasks which may be completed in a shorter time may not.

FIG. 8 depicts a series of screen images 810, 820, 830, and 840 which may be displayed to a driver, for example on electronic display 152. These screen images may identify tasks required to correct identified problem conditions. In this example, computer 110 has already determined that each of these prevention conditions should and can be corrected by the driver. The conditions include that the vehicle is not in "drive," that the automatic wipers are not on, that the automatic lights are not on, and that the vehicle that the vehicle is not in an autodrive lane. Thus, computer 110 has generated a set of tasks and associated screen images 810, 820, 830, and 840. As noted above, these tasks and screen images are presented in a certain order.

In this example, the first task includes shifting the vehicle into "drive" as shown in screen image 810. Once the first task is completed by the driver, the computer 110 may determined that the corresponding condition has been corrected. As a result, the computer 110 may show the next task. In this example, the next task includes turning on automatic wipers as shown in screen image 820. Again, once the task of screen image 820 is completed, the next task turning on automatic lights may be displayed as shown in screen image 830. Once this task is completed, computer 110 may display the next task, moving to an autodrive lane, as shown in screen image 840.

Accordingly, as described above, each screen image may be shown in sequence, one at a time, until each task 810, 820, 830, and 840 has been completed and the computer determines that the corresponding prevention condition no longer apply.

Once the identified problem conditions have been corrected by the driver, the computer may allow the driver to switch from the manual driving mode to the autonomous driving mode. For example, once all of the required tasks have been completed by the driver (such as those shown by screen images 810, 820, 830, and 840), computer 110 may display a message, such as that shown in screen image 850, indicating that the autonomous driving system 100 and computer 110 is ready to take control of the vehicle. In addition, computer 110 may change the color of all or a portion of the display to further indicate that the vehicle is ready for autonomous driving mode. In this regard, screen image 850 may include a different background color from screen images 810, 820, 830, and 840. Once ready, the computer may automatically switch from the manual driving mode to the autonomous driving mode or may wait for a further request from the driver to ensure the driver is actually ready.

Before switching from manual to autonomous driving mode, computer 110 may conduct the aforementioned assessments continuously. In this regard, even though the driver or computer 110 has corrected various impediments to placing the vehicle in autodrive mode, new problems may arise (or as noted above, some problems may be corrected). For example, once the driver has moved the vehicle 101 into an autodrive lane in response to the task depicted by screen image 840 of FIG. 8, the computer 110 may identify additional problems. In one example, these additional preventive conditions may include that the vehicle is not centered in a lane, that the vehicle is then moving too fast, and that the vehicle is too close to another object in the roadway.

Figure 9:
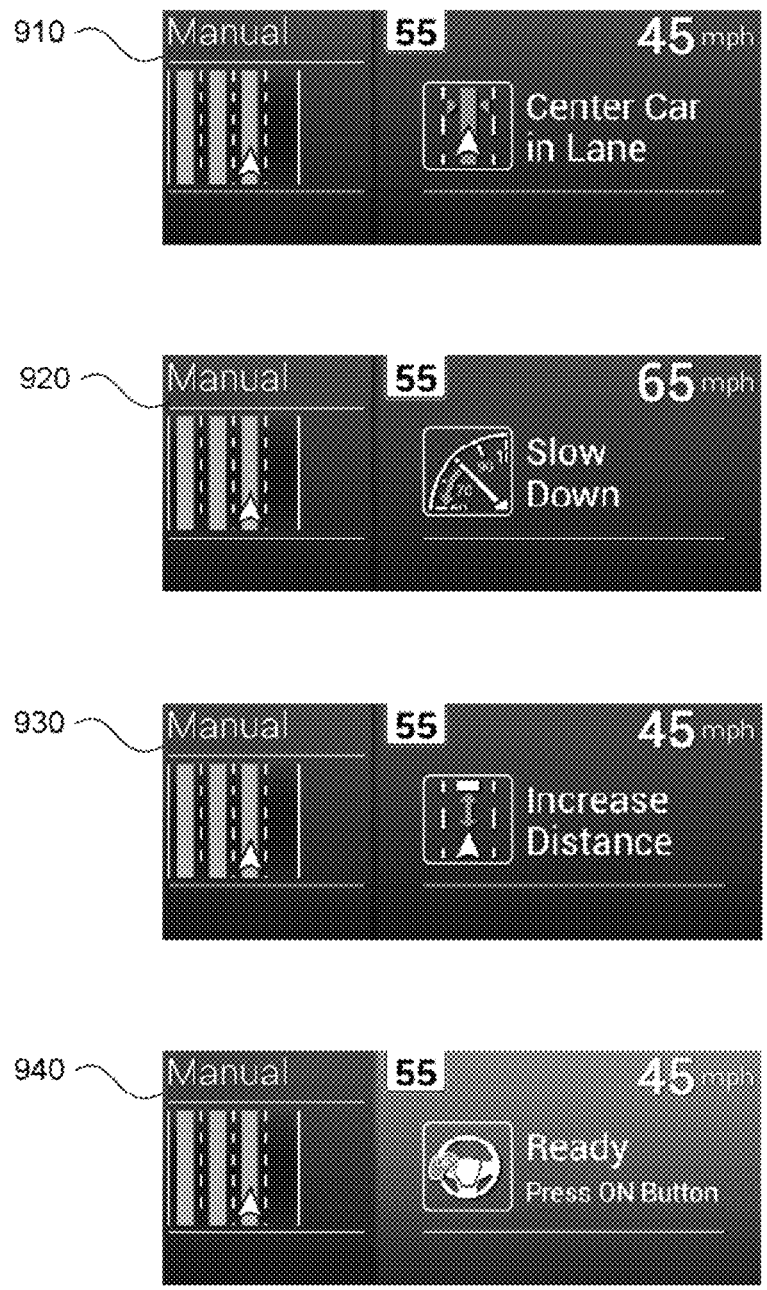
FIG. 9 is a series of screen images in accordance with aspects of the disclosure.

Based on these additional conditions, computer 110 may generate additional tasks including centering the vehicle in the lane, slowing the vehicle down, and increasing the distance between the vehicle and the another object in the roadway. As with the example of FIG. 8, computer 110 may also generate corresponding screen images to encourage the driver to correct each of the conditions. As shown in FIG. 9, computer 110 may display to the driver, for example on electronic display 152, a series of screen images 910, 920, and 930 identifying tasks to be completed by the driver. As with the example of FIG. 8, each screen image may be displayed one at a time until the driver has completed the task and the computer determines that the corresponding condition has been corrected. Again, once the computer 110 determines that there are no remaining or newly identified preventive conditions, computer 110 may display a message, such as that shown in screen image 940, indicating that the autonomous driving system 100 and computer 110 is ready to take control of the vehicle.

Figure 10:
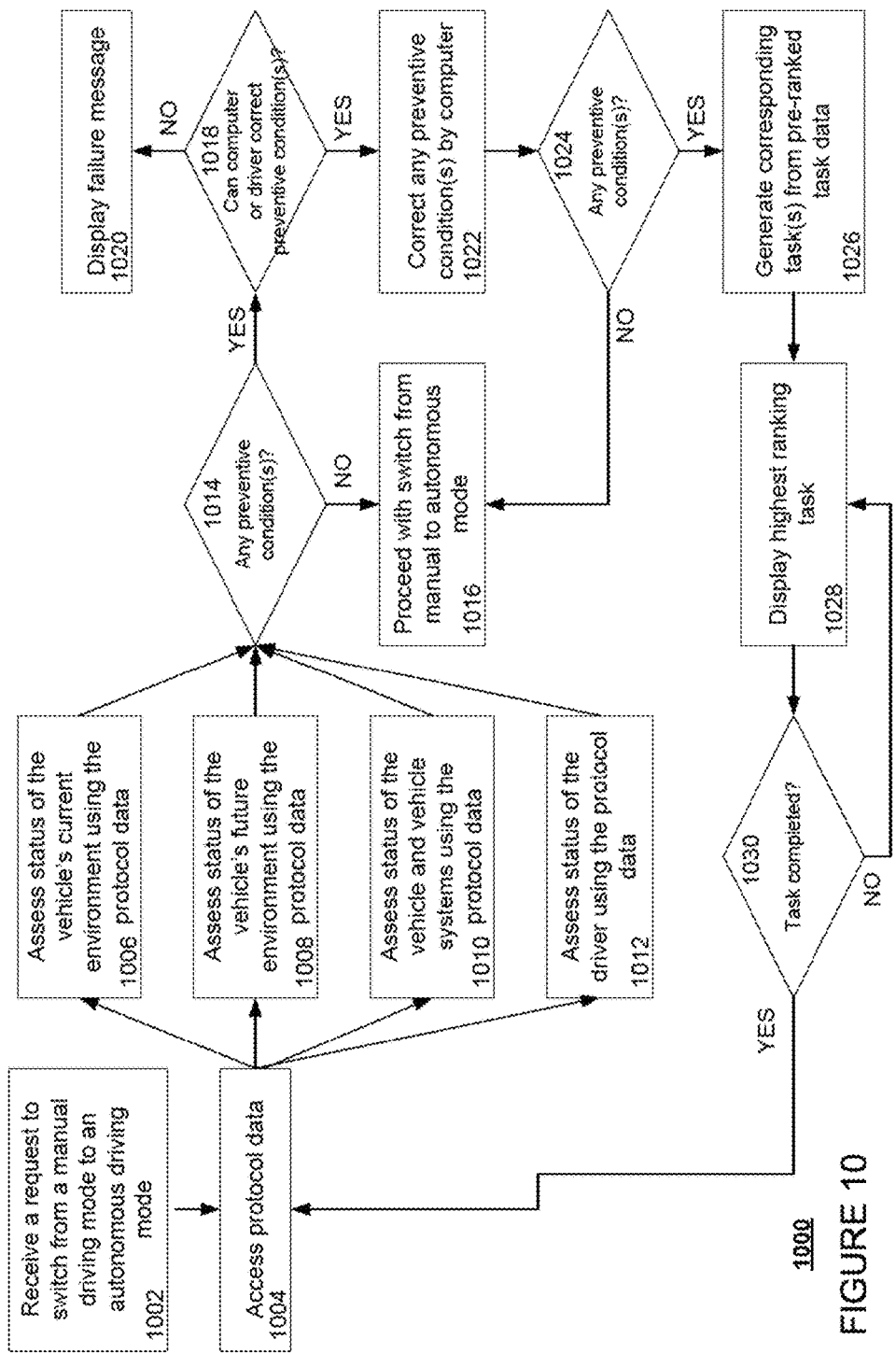
FIG. 10 is a flow diagram in accordance with aspects of the disclosure.

Flow diagram 100 of FIG. 10 is an example of some of the aspects described above which may be performed by a computer associated with a vehicle having an autonomous driving mode and a manual driving mode. For example, computer 110 of vehicle 101 may receive an autodrive request or a request to switch from a manual driving mode to an autonomous driving mode at block 1002. The computer 110 then responds by accessing protocol data at block 1004. The protocol data is then used to assess the status of the vehicle's current environment, the vehicle's future environment, the vehicle, and the driver at blocks 1006, 1008, 1010, and 1012, respectively. Again, these assessments may be conducted in any order. The computer 110 then determines if these assessments have identified any problem conditions at block 1014. If not, the computer 110 proceeds with the switch from the manual to the autonomous driving mode at block 1016.

If as a result of the assessments, the computer 110 does identify one or more preventive conditions, the computer determines whether the computer or a driver can correct those identified conditions at block 1018. If the conditions cannot be corrected, the computer 110 displays a failure message to the driver at block 1020. As noted above, this failure message may indicate the particular issue for the failure.

If the computer 110 or a driver can sufficiently promptly correct the identified problems, the computer may correct problems that can be corrected by the computer at block 1022. If at block 1024 no identified preventive conditions remain, the computer 110 proceeds with the switch from the manual to the autonomous driving mode at block 1016.

Returning to block 1024, if after the computer corrects any of the problems, other problems remain, the computer 110 generates a corresponding task or task using pre-ranked task data for each of the remaining problems at block 1026. The computer 100 then displays the highest ranking task for completion by the driver of vehicle 101 at block 1028. The computer continues to display the task until it is completed at block 1030. In this example, once the task is completed, the computer returns to block 1004 to access the protocol data and reassess the status of the various features of blocks 1006, 1008, 1010, and 1012. The process may continue until all of the identified problems are corrected and the computer 110 proceeds with the switch from manual to autonomous driving mode at block 1016.

Alternatively, once a task is completed at block 1030, the computer may simply display the next highest ranking task until all of the identified problem conditions are corrected. Once this occurs, the computer 110 proceeds with the switch from manual to autonomous driving mode.

Conducting the aforementioned assessments and performing corrective actions can prevent certain problems, such as potential safety issues, actions that the user would consider disruptive, actions that may damage the car over time, etc. For example, if computer 110 is unable to drive autonomously in a particular lane or a shoulder because of some known condition, it may be dangerous to begin driving autonomously in that location. In another example, if the vehicle is too close to another vehicle or driving too fast, switching directly into autonomous driving mode may cause the computer to slow the vehicle down immediately and dramatically. This may be uncomfortable and also disconcerting for the driver. In yet another example, if the vehicle is not sufficiently centered in a lane, computer 110 may surprise the driver by moving into a lane in which the driver did not intend to drive. Abrupt lane changes may make the driver nervous or uncomfortable. Thus, the features described herein allow the driver to maintain control until both the computer 110, and the driver, are assured that it is safe to switch driving modes.

Once the vehicle is in the autonomous driving mode, if any conditions arise which require a switch to manual driving mode, computer 110 may continue at least some of the assessments as described above and also made other assessments regarding the continued safety of driving in autonomous driving mode. If any preventive conditions are identified which cannot or should not be corrected immediately by computer 110, the computer 110 may inform the driver of the need to switch back into the manual driving mode. For example, if the computer 110 detects some emergency or some preventive condition such as a loss of communication with some component of the autonomous driving system, the computer 110 may immediately inform the driver of the need to switch to the manual driving mode. By doing so quickly, even when the preventive condition does not require immediate attention, the computer may provide the driver with as much time as possible to take control of the vehicle.

Under certain specific conditions, the computer 110 may also discourage the driver from switching from autonomous mode and into the manual driving mode. Each vehicle may include an emergency manual override that allows the driver to switch to the manual driving mode under any conditions, but under normal operation there may be instances where switching to manual mode is prevented or delayed.

For example, after the first few seconds in autonomous driving mode, the computer 110 may detect that the driver is attempting to disengage the autonomous driving mode, such as by turning the steering wheel or hitting the accelerator. Because the request to disengage occurs so quickly after the request to engage, the computer 110 may determine that the request to disengage was unintentional. In this regard, rather than automatically disengaging, computer 110 may provide a warning to the driver that the autonomous driving mode is disengaging and also continue to control some aspects of the vehicle until further actions by the driver, such as by continuing to turn the steering wheel or hit the accelerator, which indicate that the driver was indeed attempting to disengage the autonomous driving mode.

In another example, the computer 110 may prevent the driver from switching to manual driving mode when the vehicle is performing an action that cannot be easily transferred to the driver before the action is complete. For example, it may not be easy to safely return control to the driver in the middle of a sharp turn. In this regard, computer 110 may continuously make this assessment and provide a warning during those times when the computer determines that switching to manual driving mode would be unsafe or uncomfortable for the driver. This warning may be changed or removed during times when the computer determines that switching to manual driving mode would be safe and comfortable.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   receiving, by one or more processors, a request to switch a vehicle from a manual driving mode to an autonomous driving mode;
   in response to receiving the request, using, by the one or more processors, protocol data to assess (i) the status of the vehicle's environment, (ii) the vehicle, and systems of the vehicle, and (iii) a user of the vehicle;
   selecting, by the one or more processors, a set of driving conditions from a plurality of predetermined driving conditions based on one or more of the assessments;
   generating, by the one or more processors, a set of tasks based on the selected set of driving conditions wherein each task is one that may be performed by a driver to change the condition;
   selecting, by the one or more processors, as a first task of the set of tasks based on a priority of the tasks;
   displaying, by the one or more processors, to the user of the vehicle the first task of the set of tasks;
   when the first task has been completed by the user, reassessing, by the one or more processors, the priority of the tasks in order to select a second task of the set of tasks based on the priority of the tasks;
   displaying, by the one or more processors, to the user of the vehicle the second task;
   upon determining that all of the tasks of the set of tasks are completed, switching, by the one or more processors, the vehicle from a manual driving mode to an autonomous driving mode.

2. The method of claim 1, wherein at least one of the assessments includes:
   accessing detailed map information;
   communicating with various systems of the vehicle;
   and communicating with a remote computer.

3. The method of claim 1, wherein at least one of the assessments includes determining whether the current or future weather would make autonomous driving unsafe.

4. The method of claim 1, wherein at least one of the assessments includes determining whether the vehicle's actual location agrees with the vehicle's location relative to the detailed map information.

5. The method of claim 1, wherein at least one of the assessments includes determining whether data received from the sensors of the detection system agrees with the corresponding detailed map information.

6. The method of claim 1, wherein at least one of the assessments includes determining whether the vehicle is currently driving in an area pre-approved for initiating the autonomous mode.

7. The method of claim 1, wherein at least one of the assessments includes determining whether the roadway is paved.

8. The method of claim 1, wherein at least one of the assessments includes determining the width of the roadway.

9. The method of claim 1, wherein at least one of the assessments includes determining whether the vehicle is on a curved roadway.

10. The method of claim 1, wherein at least one of the assessments includes determining, whether the vehicle is sufficiently centered in a lane.

11. The method of claim 1, wherein at least one of the assessments includes determining whether the vehicle is facing oncoming traffic.

12. The method of claim 1, wherein at least one of the assessments includes determining whether another vehicle is pulling into the vehicle's lane proximate to the vehicle.

13. The method of claim 1, wherein at least one of the assessments includes determining whether any upcoming maneuvers would prevent a switch from manual to autonomous driving mode.

14. The method of claim 1, wherein at least one of the assessments includes determining whether the vehicle can be driving in the autonomous mode for a minimum period of time before a switch to manual mode is required.

15. The method of claim 1, wherein at least one of the assessments includes determining whether the vehicle has met a minimum maintenance standard.

16. The method of claim 1, wherein at least one of the assessments includes determining whether the vehicle's automatic wipers are currently on.

17. The method of claim 1, wherein at least one of the assessments includes determining whether the driver's seatbelt is properly buckled.

18. The method of claim 1, further comprising before generating the set of tasks, correcting by the one or more processors any of the set of driving conditions pre-approved for correction by the one or more processors.

19. The method of claim 1, further comprising before reassessing the priority of the tasks:
   using the protocol data to reassess (i) the status of the vehicle's environment, (ii) the vehicle, and systems of the vehicle, and (iii) a user of the vehicle; and
   reconfiguring the set of tasks based on one or more of the reassessments.

20. A system comprising one or more processors configured to:
   receive a request to switch a vehicle from a manual driving mode to an autonomous driving mode;
   in response to receiving the request, use protocol data to assess (i) the status of the vehicle's environment, (ii) the vehicle, and systems of the vehicle, and (iii) a user of the vehicle;

select a set of driving conditions from a plurality of predetermined driving conditions based on one or more of the assessments;
generate a set of tasks based on the selected set of driving conditions wherein each task is one that may be performed by a driver to change the condition;
select as a first task of the set of tasks based on a priority of the tasks;
display to the user of the vehicle the first task of the set of tasks;
when the first task has been completed by the user, reassess the priority of the tasks in order to select a second task of the set of tasks based on the priority of the tasks;
display to the user of the vehicle the second task;
upon determining that all of the tasks of the set of tasks are completed, switch the vehicle from a manual driving mode to an autonomous driving mode.

\* \* \* \* \*